US010895962B2

(12) United States Patent
Tian

(10) Patent No.: US 10,895,962 B2
(45) Date of Patent: Jan. 19, 2021

(54) APPARATUS AND METHOD FOR FACILITATING BROWSER NAVIGATION

(71) Applicant: Nokia Technologies Oy, Espoo (FI)

(72) Inventor: Wei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 250 days.

(21) Appl. No.: 14/911,547

(22) PCT Filed: Aug. 15, 2013

(86) PCT No.: PCT/CN2013/081554
§ 371 (c)(1),
(2) Date: Feb. 11, 2016

(87) PCT Pub. No.: WO2015/021637
PCT Pub. Date: Feb. 19, 2015

(65) Prior Publication Data
US 2016/0188146 A1 Jun. 30, 2016

(51) Int. Cl.
*G06F 3/00* (2006.01)
*G06F 3/0484* (2013.01)
(Continued)

(52) U.S. Cl.
CPC .......... *G06F 3/0484* (2013.01); *G06F 3/0483* (2013.01); *G06F 16/9562* (2019.01); *G06F 16/9577* (2019.01)

(58) Field of Classification Search
CPC .. G06F 3/0481; G06F 3/04812; G06F 3/0483; G06F 3/0484; G06F 16/9577; G06F 16/9562
See application file for complete search history.

(56) References Cited

U.S. PATENT DOCUMENTS

| 7,383,510 B2 * | 6/2008 | Pry | G06F 17/30864 |
| | | | 707/E17.108 |
| 7,770,122 B1 * | 8/2010 | Shaik | G06F 17/3089 |
| | | | 709/201 |

(Continued)

FOREIGN PATENT DOCUMENTS

| CN | 101739456 A | 6/2010 |
| CN | 102955797 A | 3/2013 |

(Continued)

OTHER PUBLICATIONS

Extended European Search Report received for corresponding European Patent Application No. 13891398.3, dated Jan. 30, 2017, 8 pages.

(Continued)

*Primary Examiner* — Kieu D Vu
*Assistant Examiner* — Andrew Chung
(74) *Attorney, Agent, or Firm* — Mintz Levin Cohn Ferris Glovsky and Popeo, P.C.

(57) ABSTRACT

Mechanisms are described for facilitating navigation between webpages, such as during web-surfing operations. A first webpage may be presented to a user, and the user may provide a marking input regarding a position on the first webpage to be marked. A visual representation of the position may be presented to the user on the device display, such as within a marker box that may be presented overlying the webpage content. The user may then navigate to another, second webpage, which may be presented for the user's consumption. To navigate back to the first webpage and view the contents of that webpage at the marked position, the user may provide a navigation input via the visual representation during presentation of the second webpage. In response to the navigation input, the first webpage may be presented to the user at the position that was marked.

9 Claims, 7 Drawing Sheets

(51) Int. Cl.
  *G06F 16/957* (2019.01)
  *G06F 16/955* (2019.01)
  *G06F 3/0483* (2013.01)

(56) References Cited

U.S. PATENT DOCUMENTS

| | | | |
|---|---|---|---|
| 7,899,829 B1* | 3/2011 | Malla | G06F 16/9562 707/741 |
| 8,640,023 B1* | 1/2014 | Murray | G06F 17/30873 715/230 |
| 2001/0011285 A1 | 8/2001 | Kanno et al. | |
| 2002/0129114 A1 | 9/2002 | Sundaresan et al. | |
| 2003/0074416 A1 | 4/2003 | Bates et al. | |
| 2004/0003351 A1 | 1/2004 | Sommerer et al. | |
| 2004/0233235 A1 | 11/2004 | Rubin et al. | |
| 2005/0028089 A1 | 2/2005 | Aoki et al. | |
| 2005/0066286 A1* | 3/2005 | Makela | G06F 3/04817 715/764 |
| 2006/0048047 A1* | 3/2006 | Tao | G06F 17/241 715/232 |
| 2006/0224997 A1* | 10/2006 | Wong | G06F 17/30884 715/838 |
| 2006/0265417 A1* | 11/2006 | Amato | G06F 17/30864 |
| 2008/0270891 A1 | 10/2008 | Friedman et al. | |
| 2008/0301555 A1* | 12/2008 | Vartiainen | G06F 17/30876 715/704 |
| 2008/0313722 A1* | 12/2008 | Cho | G06F 3/0481 726/7 |
| 2009/0199106 A1* | 8/2009 | Jonsson | G06F 17/30884 715/744 |
| 2009/0327973 A1* | 12/2009 | Lee | G06F 9/45512 715/854 |
| 2010/0131870 A1* | 5/2010 | Park | G06F 3/0481 715/760 |
| 2010/0268606 A1* | 10/2010 | Wu | G06Q 30/02 705/14.54 |
| 2011/0078487 A1* | 3/2011 | Nielsen | G06Q 30/02 714/2 |
| 2011/0202827 A1* | 8/2011 | Freishtat | G06Q 30/02 715/234 |
| 2011/0202848 A1* | 8/2011 | Ismalon | G06F 17/3089 715/738 |
| 2011/0202889 A1* | 8/2011 | Ludwig | G06F 3/04815 715/856 |
| 2011/0252311 A1* | 10/2011 | Kay | G06F 17/243 715/255 |
| 2011/0289394 A1* | 11/2011 | Roh | G06F 17/30873 715/205 |
| 2012/0010995 A1* | 1/2012 | Skirpa | G06F 3/0481 705/14.49 |
| 2012/0084732 A1* | 4/2012 | Filippov | G06F 3/0482 715/838 |
| 2012/0131495 A1* | 5/2012 | Goossens | G06F 3/04815 715/782 |
| 2012/0210211 A1* | 8/2012 | Min | G06F 17/30884 715/255 |
| 2013/0227468 A1* | 8/2013 | Wu | G06F 3/0488 715/786 |
| 2014/0047352 A1* | 2/2014 | Leppan | G06F 17/30884 715/749 |
| 2014/0201608 A1* | 7/2014 | Arputharaj | G06F 17/30997 715/202 |
| 2014/0282269 A1* | 9/2014 | Strutt | G06F 3/04883 715/863 |
| 2014/0359489 A1* | 12/2014 | Zhao | G06F 17/30876 715/760 |
| 2015/0040030 A1* | 2/2015 | Artz | G06F 3/0481 715/748 |

FOREIGN PATENT DOCUMENTS

| | | |
|---|---|---|
| JP | 2004-510214 A | 4/2004 |
| JP | 2009-075908 A | 4/2009 |
| JP | 2010-165262 A | 7/2010 |
| JP | 2011-070380 A | 4/2011 |
| JP | 2012-022497 A | 2/2012 |
| JP | 2012-078925 A | 4/2012 |
| JP | 2012-155589 A | 8/2012 |
| WO | 2001/084370 A2 | 11/2001 |
| WO | 2008/142614 A1 | 11/2008 |

OTHER PUBLICATIONS

"Save Page Position in Firefox bookmarks", Ghacks.net, Retrieved on Jan. 30, 2017, Webpage available at : http://www.ghacks.net/2013/06/04/save-page-position-in-firefox-bookmarks/.

Office action received for corresponding Japanese Patent Application No. 2016-533769, dated Mar. 21, 2017, 3 pages of office action and 7 pages of translation available.

Kuppusamy et al., "Live-Marker: A Personalized Web Page Content Marking Tool", International Journal of Information Technology and Knowledge Management, vol. 4, No. 2, Jul.-Dec. 2011, pp. 485-488.

"Placemarker", Canisbos Safari Extensions, Retrieved on Jul. 18, 2016, Webpage available at : http://canisbos.com/placemarker.

"Placemarker Safari Extension", MacUpdate, Retrieved on Jul. 18, 2016, Webpage available at : http://www.macupdate.com/app/mac/35362/placemarker-safari-extension.

"Hyper-Anchor", Hyper-Anchor, Retrieved on Jul. 18, 2016, Webpage available at : http://www.hyper-anchor.org/en/.

Office action received for corresponding Vietnam Patent Application No. 1-2016-00892, dated Apr. 27, 2016, 1 pages of office action and 1 pages of office action translation available.

International Search Report and Written Opinion received for corresponding Patent Cooperation Treaty Application No. PCT/CN2013/081554, dated May 20, 2014, 12 pages.

* cited by examiner

APPARATUS AND METHOD FOR FACILITATING BROWSER NAVIGATION

RELATED APPLICATION

This application was originally filed as Patent Cooperation Treaty Application No. PCT/CN2013/081554 filed Aug. 15, 2013.

TECHNOLOGICAL FIELD

Example embodiments of the present invention relate generally to facilitating navigation between webpages.

BACKGROUND

As user devices become smaller and more powerful, users are able to access and view content on their mobile devices from a variety of sources. For example, users can access and view webpage content on mobile devices such as tablet computers, mobile telephones, portable digital assistants (PDAs), and other user devices. Due to the relatively small size of the display on a mobile device, webpage content may not be fully displayed to the user, and the user may need to scroll to see additional content. In addition, users often find themselves navigating between different webpages during a given web-surfing session.

BRIEF SUMMARY OF EXAMPLE EMBODIMENTS

Accordingly, it may be desirable to provide tools that allow users of electronic devices, including mobile devices, to navigate between webpages to certain, user-defined positions within those webpages such that the user's place within a particular webpage is not necessarily lost when the user navigates to another webpage.

In some embodiments, an apparatus may be provided that includes at least one processor and at least one memory including computer program code. The at least one memory and the computer program code may be configured to, with the processor, cause the apparatus to at least provide for presentation of a first webpage to a user, receive a marking input from the user regarding a position on the first webpage to be marked, provide for presentation of a visual representation of the position, provide for presentation of a second webpage to the user, and receive a navigation input from the user via the visual representation during presentation of the second webpage, where receipt of the navigation input causes presentation of the first webpage at the position.

The visual representation may, for example, comprise a snapshot of the first webpage at the position. Moreover, the at least one memory and the computer program code may be configured to, with the processor, cause the apparatus to provide for presentation of a marker box, wherein at least one of the marking input or the navigation input is received via the marker box. In some cases, the at least one memory and the computer program code may be configured to, with the processor, cause the apparatus to provide for presentation of the visual representation of the position within the marker box. The marker box may comprise a plurality of marker boxes, and the at least one memory and the computer program code may be configured to, with the processor, cause the apparatus to receive a plurality of marking inputs via the plurality of marker boxes.

The marking input may, in some embodiments, be a first marking input, and the position may be a first position. The at least one memory and the computer program code may be configured to, with the processor, cause the apparatus to receive a second marking input from the user regarding a second position on the second webpage to be marked and to provide for presentation of a visual representation of the second position. In addition, the visual representation may be provided overlying content displayed to the user from the first webpage or the second webpage.

In other embodiments, a method and a computer program product are described for facilitating navigation between webpages by providing for presentation of a first webpage to a user; receiving a marking input from the user regarding a position on the first webpage to be marked; providing for presentation of a visual representation of the position; providing for presentation of a second webpage to the user; and receiving a navigation input from the user via the visual representation during presentation of the second webpage, where receipt of the navigation input causes presentation of the first webpage at the position.

The visual representation may comprise a snapshot of the first webpage at the position. Moreover, in some cases, providing for presentation of a visual representation of the position may comprise providing for presentation of a marker box, wherein at least one of the marking input or the navigation input is received via the marker box. Providing for presentation of a visual representation of the position may comprise providing for presentation of the visual representation of the position within the marker box. Additionally or alternatively, the marker box may comprise a plurality of marker boxes, and receiving a marking input from the user may comprise receiving a plurality of marking inputs via the plurality of marker boxes.

In some cases, the marking input may be a first marking input and the position may be a first position. A second marking input may be received from the user regarding a second position on the second webpage to be marked, and presentation of a visual representation of the second position may be provided for. In some cases, the visual representation may be provided overlying content displayed to the user from the first webpage or the second webpage.

In still other embodiments, an apparatus is provided for facilitating navigation between webpages. The apparatus includes means for providing for presentation of a first webpage to a user; means for receiving a marking input from the user regarding a position on the first webpage to be marked; means for providing for presentation of a visual representation of the position; means for providing for presentation of a second webpage to the user; and means for receiving a navigation input from the user via the visual representation during presentation of the second webpage. Receipt of the navigation input may cause presentation of the first webpage at the position.

In some embodiments, the visual representation may comprise a snapshot of the first webpage at the position. Additionally or alternatively, the means for providing for presentation of a visual representation of the position may comprise means for providing for presentation of a marker box, wherein at least one of the marking input or the navigation input is received via the marker box. Moreover, the marking input may be a first marking input and the position may be a first position, where the apparatus further comprises means for receiving a second marking input from the user regarding a second position on the second webpage to be marked and means for providing for presentation of a visual representation of the second position.

BRIEF DESCRIPTION OF THE SEVERAL VIEWS OF THE DRAWINGS

Figure 1:
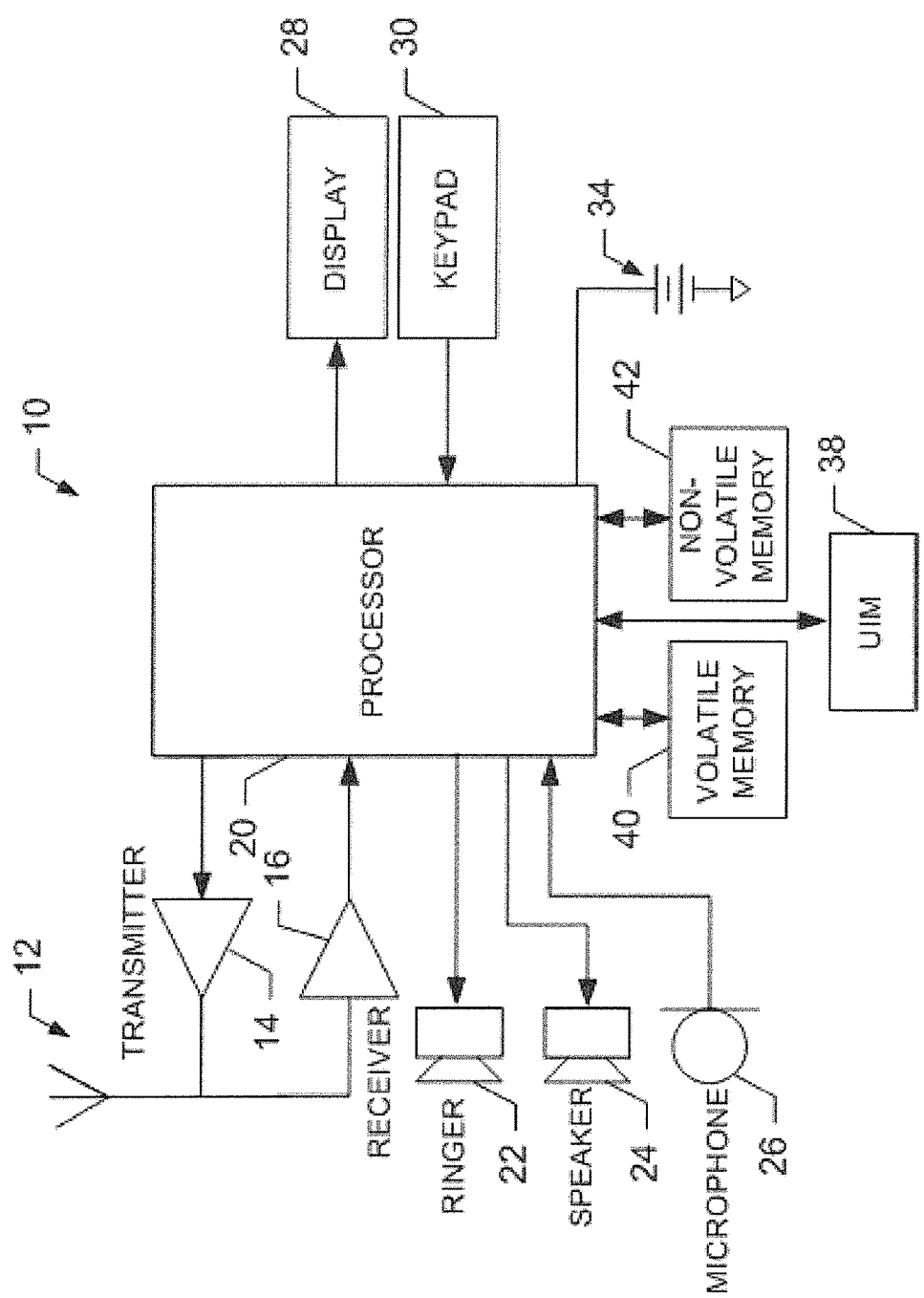
Figure 2:
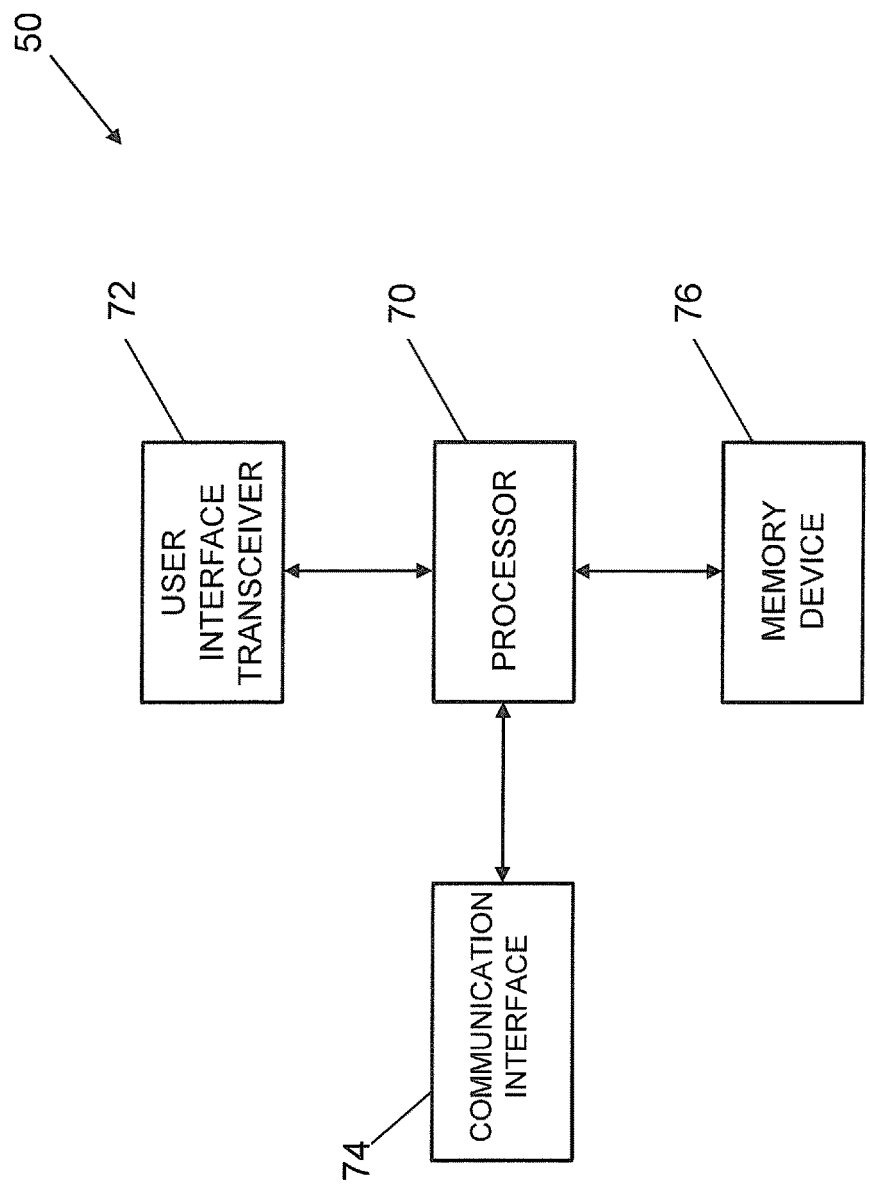
Figure 3:
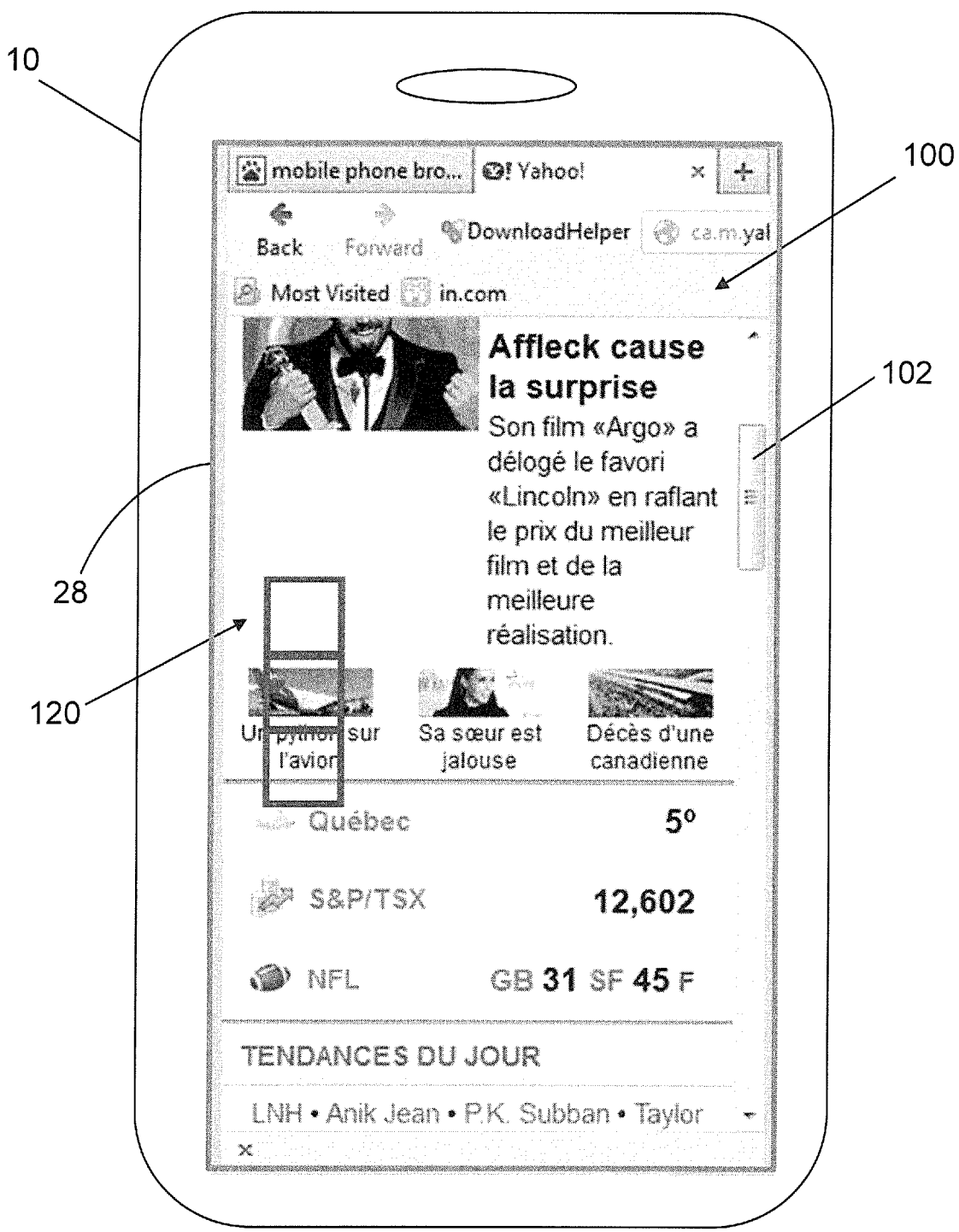
Figure 4:
Figure 5:
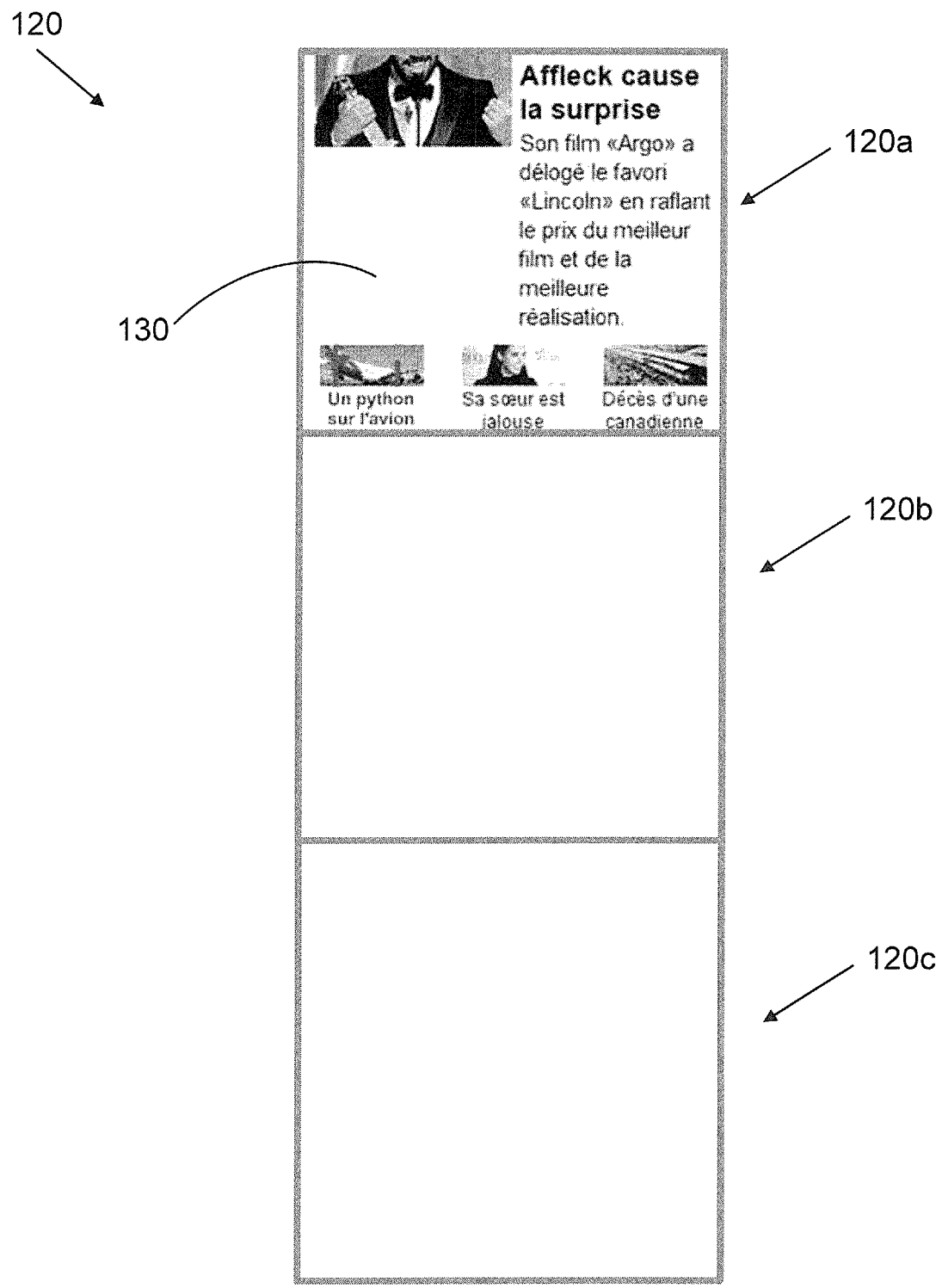
Figure 6:
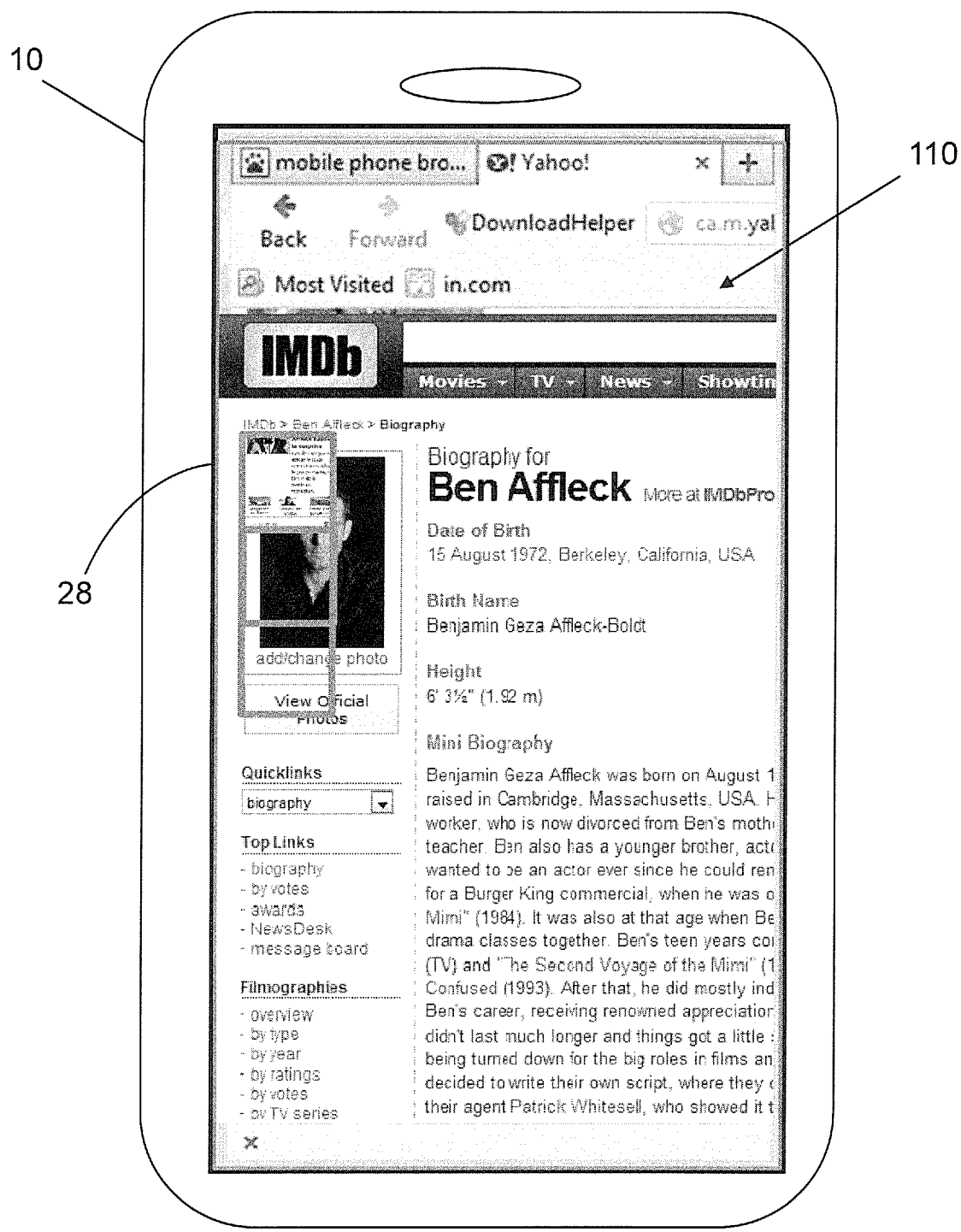
Figure 7:
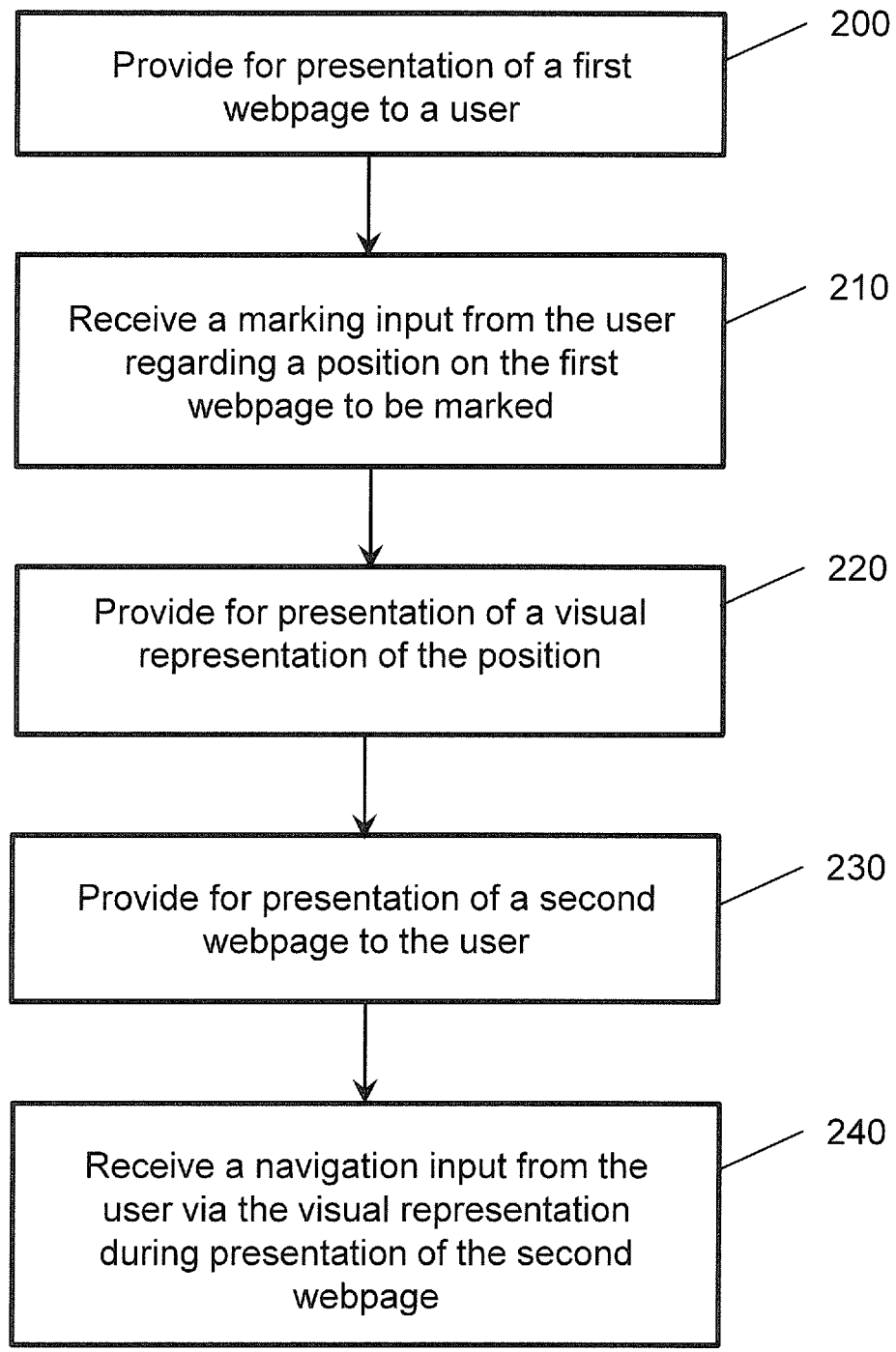

Having thus described example embodiments of the invention in general terms, reference will now be made to the accompanying drawings, which are not necessarily drawn to scale, and wherein:

FIG. 1 illustrates one example of a communication system according to an example embodiment of the present invention;

FIG. 2 illustrates a schematic block diagram of an apparatus for facilitating navigation between webpages according to an example embodiment of the present invention;

FIG. 3 illustrates a user device with a display upon which a first webpage and empty marker boxes are presented according to an example embodiment of the present invention;

FIG. 4 illustrates the user device of FIG. 3 after the user has provided a marking input according to an example embodiment of the present invention;

FIG. 5 illustrates a close-up view of the marker boxes of FIG. 4 according to an example embodiment of the present invention;

FIG. 6 illustrates the user device of FIG. 4 where a second webpage is presented according to an example embodiment of the present invention; and FIG. 7 illustrates a flowchart of methods of facilitating navigation between webpages according to an example embodiment of the present invention.

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, it is common for users to access websites and view webpage content on devices, such as mobile devices, which have relatively small displays. Due to the size of the displays on mobile devices, and the large amounts of content that may be accessed on certain webpages, only a portion of the webpage content may be visible on the display at any given time. A user may, thus, need to scroll down from the top of a webpage to view additional "off-screen" content.

In addition, it is sometimes necessary or desirable for a user to navigate to other webpages in the course of consuming content from a particular webpage (e.g., while "surfing the Web"). For example, the user may be reading a news article webpage and may wish to learn more about a particular term in the text that is associated with a hyperlink. By selecting the hyperlink, the user may be taken to another webpage (e.g., within the same website or on a different website), and thus the content from the original webpage that the user was consuming (the news article in this example) may no longer be displayed on the screen. Having navigated away from the original webpage, in order to return to the original webpage to resume consumption of that content, the user may be forced to manually search for the Uniform Resource Locator (URL) of the original webpage in the web browser history, in a bookmark, or in the user's own memory. Upon selecting a displayed link from the history, selecting the corresponding bookmark, or typing the URL from memory into the URL field in the header of the user's web browser, the user may access and view the original webpage; however, the position of the webpage content under conventional methods is generally re-set, such that the user would need to scroll to the appropriate position in the webpage where the user left off previously. Thus, continuing the above example, the user would have to find where he left off on the original webpage by scrolling to the spot where the user selected the hyperlink that navigated him away from the news article so that he can consume the remainder of content.

For a user to consume content over multiple webpages, where the user will be switching between different positions within the same webpage or on different webpages, conventional techniques require the user to provide multiple inputs to accomplish the desired navigation and re-positioning operations. This can be both cumbersome and time-consuming for the user and may, in some cases, cause the user to read previously consumed content or miss portions of the content all together, such as when the user has forgotten the position on the webpage where the user left off and must take his "best guess" as to where to pick up consumption of the webpage.

Accordingly, example embodiments of the present invention provide mechanisms for facilitating navigation between different webpages by allowing the user to mark a position on a first webpage and navigate to a second webpage, while maintaining the ability to navigate directly back to the marked position on the first webpage from the second webpage. In other words, by marking the user's position on a particular webpage being consumed, the user can be free to navigate to other webpages and can be taken to the original webpage, to the specific position that the user marked, in an easy, efficient, and accurate manner.

Turning now to FIG. 1, which provides one example embodiment, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, which depicts certain elements of an apparatus 50 for facilitating navigation between webpages. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, part or all of the apparatus 50 may be on a fixed device such as a server or other service platform and the content may be presented (e.g., via a server/client relationship) on a remote device such as a user terminal (e.g., the mobile terminal 10) based on processing that occurs at the fixed device.

It should also be noted that while FIG. 2 illustrates one example of a configuration of an apparatus 50 for facilitating navigation between webpages, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

Turning now to FIG. 3, in general, an apparatus 50 (shown in FIG. 2) is provided, such as an apparatus embodied by the mobile terminal 10 of FIG. 1 (e.g., a cellular phone) that has or is otherwise associated with a display 28, such as a touch screen display. As described above, the apparatus may comprise at least one processor (e.g., processor 70 of FIG. 2) and at least one memory (e.g., memory device 76 of FIG. 2) including computer program code. The at least one memory and the computer program code may be configured to, with the processor, cause the apparatus to provide for presentation of a first webpage 100 to a user. In the depicted example of FIG. 3, for instance, the user may be viewing an article from a French online news source regarding Ben Affleck's movie Argo. As the user reads more of the article, the user may need to scroll down the page (e.g., using the scroll bar 102) to view portions of the article that cannot be displayed and are "off-screen" (e.g., "below" the portion of the article that fits within the screen and is visible to the user).

As the user scrolls the page, the user's position on the webpage changes. The position of the scroll bar 102 may, for example, be an indication of the user's position within the webpage. In this example, in the process of reading the article about the movie Argo, the user may find himself intrigued by the actor Ben Affleck and may wish to learn more about Affleck's life. Thus, in this example, the user may navigate to a second webpage 110 that provides a biography of Ben Affleck, as shown in FIG. 6. After reading about Ben Affleck's life, however, the user may wish to finish reading the article about the movie Argo, picking up at the position on the first webpage 100 where the user left off prior to navigating to the second webpage, for example.

Accordingly, in some embodiments, the at least one memory and the computer program code may be further configured to, with the processor, cause the apparatus to receive a marking input from the user regarding a position on the first webpage 100 to be marked. Turning again to FIG. 3, for example, in some embodiments the at least one memory and the computer program code may be configured to, with the processor, cause the apparatus to provide for presentation of a marker box 120. The marking input may, in some cases, be received via the marker box 120. For example, the user may click inside the marker box 120 to provide the marking input, resulting in the user's current position within the first webpage (e.g., the displayed webpage) being marked as the position to which the user may wish to navigate after surfing other webpages. Alternatively, the user may provide a marking input in the form of a "long tap" within the marker box 120. A long tap operation may be accomplished, for example, when the user taps the touch screen display with a duration of contact (e.g., between the user's finger and the display) that is longer than a pre-configured time (such as tapping with a 3 second duration as opposed to a brief 0.5-second tap).

The at least one memory and the computer program code may be configured to, with the processor, cause the apparatus to provide for presentation of a visual representation of the position that has been marked by the user (e.g., through provision of the marking input). For example, in some cases, the visual representation 130 may comprise a snapshot of the first webpage at the position that has been marked, as shown in FIG. 4. As depicted in FIGS. 4 and 5, in some embodiments, the at least one memory and the computer program code may be configured to, with the processor, cause the apparatus to provide for presentation of the visual representation 130 within the marker box 120. In other cases, however, the visual representation may not be presented within a marker box. In some cases, the visual representation may be a simplified representation of the webpage and position, such as a depiction of the webpage's title icon (e.g., a company website's logo or a search engine logo) with a horizontal line or other indicia marking the position within the marker box (e.g., with respect to the top and bottom edges of the marker box) corresponding to the marked position within the webpage. In still other cases, a more generic identification of the webpage may be presented as the visual representation, such as a number (1, 2, 3, etc.) or a letter (A, B, C, etc.) corresponding to the first, second, or third visited webpage, respectively.

Furthermore, in some embodiments, the marker box 120 may include a number of marker boxes. In FIGS. 3-6, for example, three marker boxes 120 are presented. Thus, in some cases, the at least one memory and the computer program code may be configured to, with the processor, cause the apparatus to receive a plurality of marking inputs via the plurality of marker boxes 120. In this way, the user may mark (in this example) three positions over one, two, or three webpages, with each position being visually represented within a marker box. FIG. 5, for example, shows a close-up view of the marker box 120 of FIG. 4 having three boxes 120a, 120b, 120c. In the depicted example of FIG. 5, the user has marked only one position, which is visually represented in marker box 120a. Thus, in this example, the user can mark up to two more positions, either in the same webpage represented in box 120a or in other, different webpages, and each position the user marks may be visually represented in the remaining two marker boxes 120b, 120c.

Turning again to FIG. 4, for example, after marking his current position in the first webpage (e.g., the webpage regarding Ben Affleck's movie Argo), the user may decide to navigate to a second webpage to read more about Ben Affleck's life (in this example). Accordingly, the at least one memory and the computer program code may be configured to, with the processor, cause the apparatus to provide for presentation of a second webpage 110 to the user, shown in FIG. 6. The at least one memory and the computer program code may be configured to, with the processor, cause the apparatus to receive a navigation input from the user via the visual representation during presentation of the second webpage 110, and receipt of the navigation input may cause presentation of the first webpage 100 at the position that had been marked by the user. In this way, once the user is done with the second webpage 110 and wishes to navigate back to the first webpage 100, the user may provide the navigation input, which will cause the first webpage to be displayed at the position that the user had marked. Thus, in the depicted example, receipt of the navigation input may navigate the user from the webpage and position shown in FIG. 6 to the webpage and position shown in FIG. 4.

In some embodiments, for example, the navigation input may be received via the marker box 120 and/or the visual representation (e.g., the snapshot image) provided. Thus, with reference to FIG. 6, the user may provide the navigation input in the depicted example by clicking on or otherwise selecting the snapshot of the first webpage at the marked position shown in the top box of the marker box 120. Selecting the visual representation of the marked position to which the user wishes to navigate may cause the first webpage to be presented (e.g., in place of the second webpage) at the marked position, such that the user need not adjust the position within the first webpage, but rather is already positioned where he had left off within that webpage.

As noted above, the marking input received from the user may, in some cases, be a first marking input and the position that is marked may be a first position. The at least one memory and the computer program code may be configured to, with the processor, cause the apparatus to receive a second marking input from the user regarding a second position on the second webpage to be marked and to provide for presentation of a visual representation of the second position. For example, the visual representation of the second position on the second webpage may be a snapshot of the user's position within the second webpage that is displayed in a second box of the marker box 120 (e.g., a snapshot displayed in marker box 120b of FIG. 5). Thus, in some embodiments, if the user has previously marked a position with respect to one webpage (e.g., a first position within a first webpage) and subsequently wishes to mark a second position within the same webpage or a second, different webpage, the user may, in an embodiment in which multiple marker boxes 120 are provided as depicted, select an empty marker box (e.g., box 120b or 120c), thereby providing the marking input and resulting in the visual representation being provided in the selected (empty) box. In some cases, however, the user may provide the second marking input (e.g., with respect to the second position within the second webpage) via the marker box 120a that already includes a visual representation of a previously marked position. In this case, the previously marked position (e.g., the first position) may be replaced with the position being marked (e.g., the second position), and the visual representation of the newly marked position may be displayed in place of the visual representation of the previously marked position, thereby deleting or removing the previous marking.

As shown in the figures, in some cases the visual representation may be provided overlying content that is being displayed to the user from the first webpage or the second webpage. For example, the marker box 120 may be presented, as described above with reference to FIGS. 3-6, overlying the webpage content, such as by using a floating marker box. Thus, in such embodiments, as the user scrolls up or down a page, the visual representation, such as the marker box 120 and/or the snapshot of the marked position, may "float" such that they are always displayed on the screen in the same location, while the content presented behind the marker box 120 moves in response to the user's scrolling. As the user navigates from one webpage to the next, the visual representation (e.g., the snapshot presented within the marker box 120) may continue to be presented on the display of the user's device, such that the user, in some embodiments, may be able to provide marking inputs and/or navigation inputs via the marker box regardless of the webpage or webpage content being consumed.

In some embodiments, a data structure, such as an array or a database, may be used to store the URL of the webpage (e.g., the first webpage) being presented to the user, as well as the position on the webpage and a thumbnail image of the displayed webpage at that position, in response to receipt of a marking input from the user. The stored image may then be presented as the visual representation of the position (e.g., within a marker box), as described above. Furthermore, in some embodiments, the user may be able to make the marker box either visible (e.g., presented on the display) or invisible (e.g., not presented on the display), as desired. For example, a widget may be provided to the user, such as a "Marker" button or option, the selection of which by the user may result in the presentation of the marker box to the user and, as a result, activation of functionality that allows for receipt of marker and/or navigation inputs.

In response to a navigation input being received, such as when the user selects the visual representation of the marked position (e.g., clicks on the snapshot presented in a marker box corresponding to the webpage and position to which the user would like to navigate), the stored URL corresponding to the selected visual representation may be accessed and used to navigate to the respective webpage. The stored position may also be accessed and used to adjust the presentation of the webpage (e.g., scrolling the page down) to reflect the stored position.

Alternatively, when a marking input is received from the user, the marked webpage may be saved as a local page, and an anchor may be added within the page at the marked position. The anchor (e.g., an anchor identifier) may be stored, such as in a database. In this way, when the navigation input is received, such as when the user selects the visual representation of the marked position (e.g., clicks on the snapshot presented in a marker box corresponding to the webpage and position to which the user would like to navigate), the saved URL for the locally stored webpage and the anchor ID may be accessed and navigated, such that the user will be taken to the correct webpage and position within the webpage that was marked, corresponding to the anchor.

FIG. 7 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for facilitating navigation between webpages is shown in FIG. 7. FIG. 7 depicts an example embodiment of the method that includes providing for presentation of a first webpage to a user at block 200, receiving a marking input from the user regarding a position on the first webpage to be marked at block 210, and providing for presentation of a visual representation of the position at block 220. As described above, embodiments of the method may further provide for presentation of a second webpage to the user at block 230 and receipt of a navigation input from the user via the visual representation during presentation of the second webpage at block 240. Receipt of the navigation input may thus cause the presentation of the first webpage at the position marked by the user.

As described above with reference to the figures, in some cases, the visual representation may comprise a snapshot of the first webpage at the position. Moreover, in some embodiments, a marker box may be presented, and at least one of the marking input or the navigation input may be received via the marker box. The visual representation of the position may be presented within the marker box, as described above. Furthermore, in some cases, the marker box may include a plurality of marker boxes, and a plurality of marking inputs may be received via the plurality of marker boxes.

In some embodiments, the marking input may be a first marking input and the position may be a first position. A second marking input regarding a second position on the second webpage to be marked may thus be received from the user, and a visual representation of the second position may be presented (e.g., as a second snapshot in the same or a different marker box). As described above, the visual representation may be provided such that the visual representation overlies the content displayed to the user from the first webpage or the second webpage (e.g., the webpage content being displayed).

In some embodiments, certain ones of the operations above may be modified or further amplified as described below. Furthermore, in some embodiments, additional optional operations may be included. Modifications, additions, or amplifications to the operations above may be performed in any order and in any combination.

In an example embodiment, an apparatus for performing the methods of FIG. 7 above may comprise a processor (e.g., the processor 70 of FIG. 2) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 200, 220, and 230 may comprise, for example, the processor 70, the user interface transceiver 72, communication interface 74, the memory device 76, and/or a device or circuit for executing instructions or executing an algorithm for processing information as described above. Examples of means for performing operations 210 and 240 may comprise, for example, the processor 70, the user interface transceiver 72, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory comprising computer program code, the at least one memory and the computer program code configured to, with the processor, cause the apparatus to at least:
generate a graphic user interface displaying a first webpage and a marker box configured to receive a marking input;
receive a first marking input marking a first position on the first webpage;
respond to a first indication to navigate to a second webpage by at least updating the graphic user interface to display the second webpage and a first visual representation of the first webpage in the marker box, the first visual representation comprising a snapshot of a first content of the first webpage that includes the first position marked on the first webpage, the first visual representation excluding a second content of the first webpage excluding the first position marked on the first webpage, the graphic user interface being updated to display, as an overlay on top of the second webpage, the marker box including the first visual representation of the first webpage, the first visual representation of the first webpage replacing, in response the marker box including a second visual representation of a previously marked position, the second visual representation;
continue to display, as the overlay on top of the second webpage, the marker box including the first visual representation of the first webpage while a third content of the second webpage is being scrolled;
receive a second indication to navigate from the second webpage back to the first webpage, the second indication comprising a selection of the first visual representation of the first webpage included in the marker box; and
respond to the second indication by at least updating the graphic user interface to display the marker box and the first webpage at the first position associated with the first visual representation.

2. The apparatus of claim 1, wherein the marker box comprises a plurality of marker boxes, and wherein each of the plurality of marker boxes is configured to at least receive a separate marking input.

3. The apparatus of claim 1, wherein the at least one memory and the computer program code are configured to, with the processor, cause the apparatus to at least:
receive a second marking input marking a second position on the second webpage to be marked; and
update the graphic user interface to display a second visual representation of the second position in the marker box instead of the first visual representation.

4. A method comprising:
generating a graphic user interface displaying a first webpage and a marker box configured to receive a marking input;
receiving a first marking input marking a first position on the first webpage;
responding to a first indication to navigate to a second webpage by at least updating the graphic user interface to display the second webpage and a first visual representation of the first webpage in the marker box, the first visual representation comprising a snapshot of a first content of the first webpage that includes the first position marked on the first webpage, the first visual representation excluding a second content of the first webpage excluding the first position marked on the first webpage, the graphic user interface being updated to display, as an overlay on top of the second webpage, the marker box including the first visual representation of the first webpage, the first visual representation of the first webpage replacing, in response the marker box including a second visual representation of a previously marked position, the second visual representation;

continuing to display, as the overlay on top of the second webpage, the marker box including the first visual representation of the first webpage while a third content of the second webpage is being scrolled;

receiving a second indication to navigate from the second webpage back to the first webpage, the second indication comprising a selection of the first visual representation of the first webpage included in the marker box; and responding to the second indication by at least updating the graphic user interface to display the marker box and the first webpage at the first position associated with the first visual representation.

5. The method of claim 4, wherein the marker box comprises a plurality of marker boxes, and wherein each of the plurality of marker boxes is configured to at least receive a separate marking input.

6. The method of claim 4, further comprising:

receiving a second marking input marking a second position on the second webpage to be marked;

updating the graphic user interface to display a second visual representation of the second position in the marker box instead of the first visual representation.

7. A computer program product comprising at least one computer-readable storage medium having computer-executable program code portions stored therein, the computer-executable program code portions comprising program code instructions for:

generating a graphic user interface displaying a first webpage and a marker box configured to receive a marking input;

receiving a first marking input marking a first position on the first webpage;

responding to a first indication to navigate to a second webpage by at least updating the graphic user interface to display the second webpage and a first visual representation of the first webpage in the marker box, the first visual representation comprising a snapshot of a first content of the first webpage that includes the first position marked on the first webpage, the first visual representation excluding a second content of the first webpage excluding the first position marked on the first webpage, the graphic user interface being updated to display, as an overlay on top of the second webpage, the marker box including the first visual representation of the first webpage, the first visual representation of the first webpage replacing, in response the marker box including a second visual representation of a previously marked position, the second visual representation;

continuing to display, as the overlay on top of the second webpage, the marker box including the first visual representation of the first webpage while a third content of the second webpage is being scrolled;

receiving a second indication to navigate from the second webpage back to the first webpage, the second indication comprising a selection of the first visual representation of the first webpage included in the marker box; and responding to the second indication by at least updating the graphic user interface to display the marker box and the first webpage at the first position associated with the first visual representation.

8. The computer program product of claim 7, wherein the marker box comprises a plurality of marker boxes, and wherein each of the plurality of marker boxes is configured to at least receive a separate marking input.

9. The computer program product of claim 7, further comprising:

receiving a second marking input marking a second position on the second webpage to be marked;

updating the graphic user interface to display a second visual representation of the second position in the marker box instead of the first visual representation.

* * * * *